US009716681B2

(12) United States Patent
Jensen et al.

(10) Patent No.: US 9,716,681 B2
(45) Date of Patent: Jul. 25, 2017

(54) USING ANALYTICS TO OPTIMIZE PERFORMANCE OF A MESSAGING SYSTEM VIA TOPIC MIGRATION TO ALTERNATE DELIVERY METHODS

(71) Applicant: International Business Machines Corporation, Armonk, NY (US)

(72) Inventors: Brian W. Jensen, Raleigh, NC (US); Andrew R. Jones, Round Rock, TX (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 14/193,485

(22) Filed: Feb. 28, 2014

(65) Prior Publication Data

US 2015/0249625 A1    Sep. 3, 2015

(51) Int. Cl.
*G06F 15/16* (2006.01)
*G06F 15/173* (2006.01)
(Continued)

(52) U.S. Cl.
CPC .......... *H04L 51/06* (2013.01); *H04L 12/1859* (2013.01); *H04L 12/58* (2013.01);
(Continued)

(58) Field of Classification Search
CPC ..... H04L 12/58; H04L 12/1859; H04L 51/04; H04L 51/06; H04L 51/12; H04L 51/26;
(Continued)

(56) References Cited

U.S. PATENT DOCUMENTS

| 6,047,327 A * | 4/2000 | Tso ..................... G06F 17/3087 |
| | | 707/E17.116 |
| 6,353,616 B1 * | 3/2002 | Elwalid ............... H04L 47/2408 |
| | | 370/389 |

(Continued)

OTHER PUBLICATIONS

Shi et al., An MID-Based Load Balancing Approach for Topic-Based Pub-Sub Overlay Construction, Tsinghua Science and Technology, ISSN 1007-0214 5/12 pp. 589-600, vol. 16, No. 6, Dec. 2011.

(Continued)

*Primary Examiner* — Farzana Huq
(74) *Attorney, Agent, or Firm* — Schmeiser, Olsen & Watts, LLP; Michael A. Petrocelli

(57) ABSTRACT

A method and associated systems for using analytics to optimize performance of a messaging system via topic migration to alternate delivery methods. A messaging system delivers messages organized into topics to users by any of several message-delivery mechanisms, such as a publish/subscribe push mechanism and an HTTP polling pull mechanism. A processor analyzes characteristics of messages associated with a particular topic and delivered by a first delivery mechanism, and if it finds that those characteristics render the first delivery mechanism an inefficient or expensive way to deliver those messages, it determines whether a second mechanism would be more efficient or less expensive. If so, the messaging system then migrates all messages associated with the topic to the second mechanism, regardless of an identity or other characteristic of a user that receives messages associated with the topic.

17 Claims, 2 Drawing Sheets

(51) Int. Cl.
*H04L 12/58* (2006.01)
*H04L 29/08* (2006.01)
*H04L 12/18* (2006.01)
*H04L 29/06* (2006.01)

(52) U.S. Cl.
CPC .............. *H04L 29/06* (2013.01); *H04L 29/08* (2013.01); *H04L 51/12* (2013.01); *H04L 51/26* (2013.01); *H04L 67/1008* (2013.01); *H04L 67/18* (2013.01); *H04L 67/26* (2013.01); *H04L 67/322* (2013.01)

(58) Field of Classification Search
CPC ....... H04L 51/046; H04L 67/10; H04L 67/18; H04L 67/26; H04L 67/322; H04L 67/329; H04L 67/1002; H04L 67/1008; H04L 67/2842; H04L 29/06; H04L 29/08
USPC ........ 709/203, 206–207, 217, 219, 223, 231
See application file for complete search history.

(56) References Cited

U.S. PATENT DOCUMENTS

| | | | |
|---|---|---|---|
| 6,661,802 B1* | 12/2003 | Homberg | H04L 12/5601 370/229 |
| 8,521,882 B2 | 8/2013 | Amsterdam et al. | |
| 2002/0010771 A1* | 1/2002 | Mandato | H04L 12/5695 709/223 |
| 2005/0021622 A1 | 1/2005 | Cullen | |
| 2005/0256931 A1* | 11/2005 | Follmeg | G06Q 10/10 709/206 |
| 2006/0136256 A1* | 6/2006 | Roots | G06Q 10/10 705/345 |
| 2007/0088711 A1* | 4/2007 | Craggs | G06Q 10/10 |
| 2010/0241717 A1 | 9/2010 | Hawkins et al. | |
| 2012/0059882 A1* | 3/2012 | Stark | H04L 12/66 709/205 |
| 2014/0195622 A1* | 7/2014 | Cullen | G06Q 30/02 709/206 |

OTHER PUBLICATIONS

Bilodeau et al., An Analytic Study of Message Delays in Distributed Computer Networks, Original Publication Date: Jul. 31, 1976, IP.com No. IPCOM000151675D, 51 pages.

Choudhary et al., Optimization of Message Memory, Original Publication Date: Sep. 1, 1998, IP.com No. IPCOM000008819D, pp. 80-81 and cover sheet.

* cited by examiner

USING ANALYTICS TO OPTIMIZE PERFORMANCE OF A MESSAGING SYSTEM VIA TOPIC MIGRATION TO ALTERNATE DELIVERY METHODS

TECHNICAL FIELD

The present invention relates optimizing the efficiency of multi-user electronic systems.

BACKGROUND

An information-distribution system may distribute content related to a particular topic by either a push method, in which the system decides when to distribute content to users, or by a pull method, in which a user receives content in response to a user request. A system that incorporates both methods may not run efficiently if the amount of resources required to distribute content by means of pull mechanisms are not optimally allocated in relation to the amount of resources required to distribute content by means of push mechanisms.

BRIEF SUMMARY

A first embodiment of the present invention provides a method for using analytics to optimize operation of a messaging system, wherein the messaging system delivers a plurality of messages to a plurality of users, wherein each message of the plurality of messages is associated with a topic of a plurality of topics, wherein each topic of the plurality of topics is associated with a delivery means of a plurality of delivery means, wherein a first set of messages of the plurality of messages is associated with a first topic of the plurality of topics, wherein the first topic is associated with a first delivery means of the plurality of delivery means, and wherein the messaging system uses the first delivery means to deliver to users the first set of messages, and:

a processor of a computer system deeming that a delivering the first set of messages by means of the first delivery means is expensive, wherein the deeming comprises detecting that the delivering the first set of messages by means of the first delivery means causes a characteristic of the first topic to satisfy a warning condition;

the processor disassociating the first topic from the first delivery means; and the processor reassociating the first topic with a second delivery means.

A second embodiment of the present invention provides a computer program product, comprising a computer-readable hardware storage device having a computer-readable program code stored therein, said program code configured to be executed by a processor of a computer system to implement a method for using analytics to optimize operation of a messaging system, wherein the messaging system delivers a plurality of messages to a plurality of users, wherein each message of the plurality of messages is associated with a topic of a plurality of topics, wherein each topic of the plurality of topics is associated with a delivery means of a plurality of delivery means, wherein a first set of messages of the plurality of messages is associated with a first topic of the plurality of topics, wherein the first topic is associated with a first delivery means of the plurality of delivery means, and wherein the messaging system uses the first delivery means to deliver to users the first set of messages, and:

the processor deeming that a delivering the first set of messages by means of the first delivery means is expensive, wherein the deeming comprises detecting that the delivering the first set of messages by means of the first delivery means causes a characteristic of the first topic to satisfy a warning condition;

the processor disassociating the first topic from the first delivery means; and the processor reassociating the first topic with a second delivery means.

A third embodiment of the present invention provides a computer system comprising a processor, a memory coupled to said processor, and a computer-readable hardware storage device coupled to said processor, said storage device containing program code configured to be run by said processor via the memory to implement a method for using analytics to optimize operation of a messaging system, wherein the messaging system delivers a plurality of messages to a plurality of users, wherein each message of the plurality of messages is associated with a topic of a plurality of topics, wherein each topic of the plurality of topics is associated with a delivery means of a plurality of delivery means, wherein a first set of messages of the plurality of messages is associated with a first topic of the plurality of topics, wherein the first topic is associated with a first delivery means of the plurality of delivery means, and wherein the messaging system uses the first delivery means to deliver to users the first set of messages, and:

the processor deeming that a delivering the first set of messages by means of the first delivery means is expensive, wherein the deeming comprises detecting that the delivering the first set of messages by means of the first delivery means causes a characteristic of the first topic to satisfy a warning condition;

the processor disassociating the first topic from the first delivery means; and the processor reassociating the first topic with a second delivery means.

DETAILED DESCRIPTION

Figure 1:
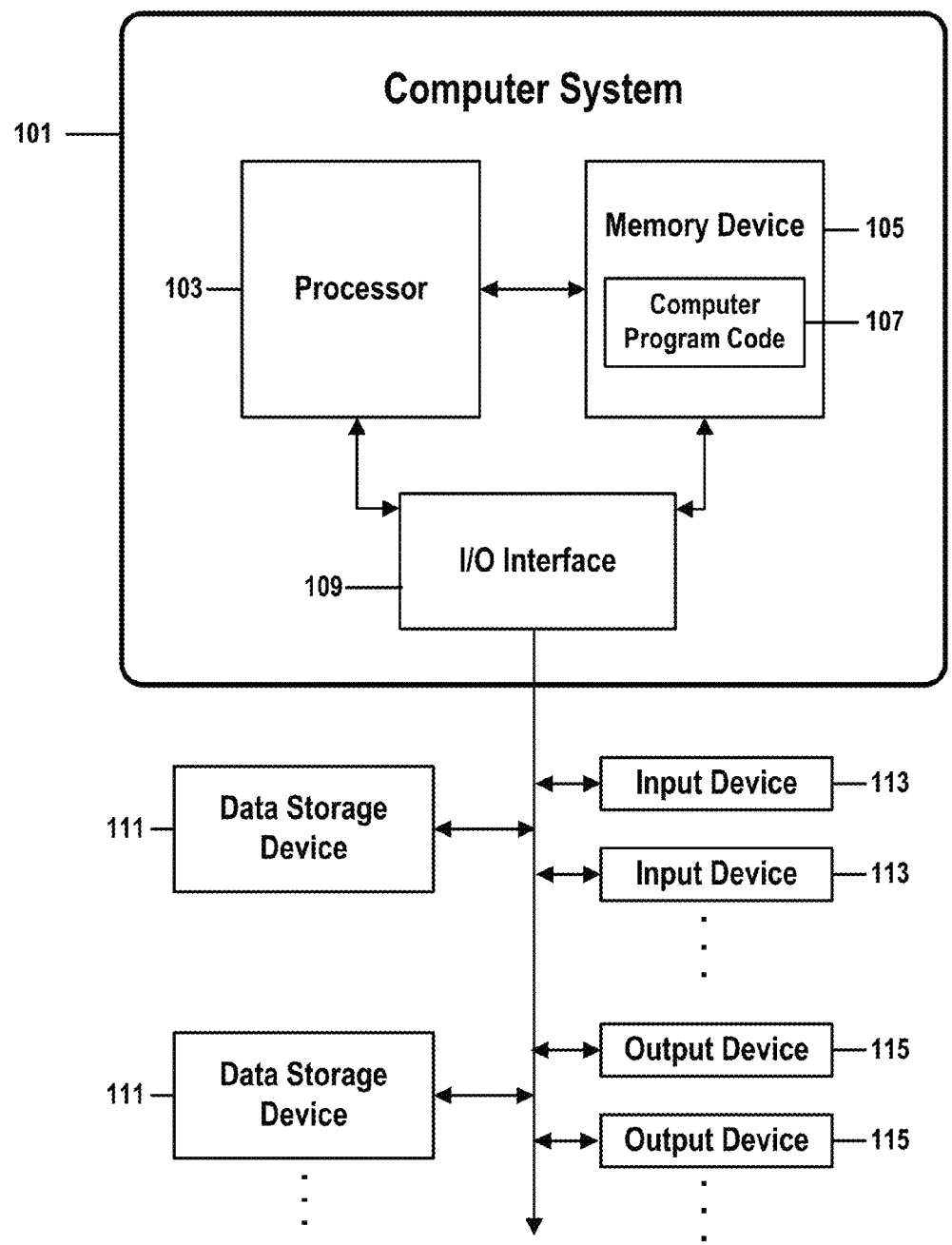
FIG. 1 shows the structure of a computer system and computer program code that may be used to implement a method for using analytics to optimize performance of a messaging system via topic migration to alternate delivery methods in accordance with embodiments of the present invention.

An information-distribution system may distribute content by either a push method, in which the system decides when to distribute content to users, or by a pull method, in which users receive content in response to a user request. Because push and pull mechanisms consume differing amounts of resources, a system that incorporates both methods may not run efficiently if content-distribution tasks are not allocated in an optimal manner between the two mechanisms.

In some cases, it may be possible to roughly balance the respective loads imposed on a system by push and pull distribution mechanisms by attempting to optimally divide a total number of users between the two methods.

But such an approach does not account for nuanced factors that may relate specific topics of communication to greater or lesser consumptions of resources. Some topics, for example, may be more likely to be associated with larger messages that comprise a greater number of bytes of data, and other topics may be associated with more frequent transmissions of data to each user. Yet other topics may be more likely to be associated with a more critical, resource-intensive, or resource-limited infrastructure, such as a lower-bandwidth wide-area network, a wireless network, or an infrastructure that comprises costly, leased, or licensed resources.

Furthermore, in some cases, a user may be associated with a more than one topic, where a first subset of these more than one topics is associated with, or would be more efficiently distributed by means of, a push mechanism, but where a second subset of these more than one topics is associated with, or would be more efficiently distributed by means of, a pull mechanism. In such cases, reallocating all communications associated with a user to either a push or a pull mechanism may actually reduce efficiency by forcing communications associated with one or more of the reallocated topics from a more-efficient communications mechanism to a less-efficient mechanism.

Methods that attempt to load-balance such a multi-topic information-distribution system by reallocating each user exclusively to either a push mechanism or to a pull mechanism, may thus be less successful than methods that allocate communications mechanisms by topic, where the allocating is performed as a function of a characteristic of messages associated with the topics themselves.

Embodiments of the present invention take such considerations into account and, in examples described herein, these embodiments may balance a first load on a multi-user information-distribution system imposed by distributing information by means of a "publish/subscribe" (or "pub/sub") push message-distribution system known to those skilled in the art with a second load imposed by distributing information by means of a "polling" pull distribution system, such as an HTTP polling mechanism, known to those skilled in the art. These embodiments perform this balancing by allocating communications by topic, rather than by user.

A publish/subscribe architecture, as known to those skilled in the art, comprises a messaging pattern in which a message sender, called a "publisher," does not associate a particular message with a particular user/receiver "subscriber." Published messages may instead be organized into "topics" to which subscriber users "subscribe" at will. In such a system, a subscriber may receive only messages associated with a subscribed topic, regardless of an identify of a received message's publisher, and each subscriber is always connected through a socket, or through an other type of persistent connection or communications interface.

Such a multi-topic publish/subscribe system architecture may thus comprise a method of electronically distributing messages, or other information, to subscribers who may subscribe to one or more categories of information (or "topics"), wherein a server publisher automatically transmits or publishes to a client a message related to a user-subscribed topic whenever information related to the topic is updated. In such a system, the server publisher, not the user subscriber, may determine when a communication must take place and the server must maintain a persistent connection to each user.

One example of such a publish/subscribe system is a system that distributes tennis scores to users during a tennis tournament via the Internet. If multiple matches are simultaneously in progress, the system may update and communicate multiple sequences of scores to a user, where each sequence may be updated at different times. A client user that uses this mechanism to monitor scores on the Internet might "subscribe" to a set of matches, and the system would then send to the user (or "publish") an updated score for each subscribed match (or "topic") as each score changes.

Because a pub/sub system must maintain a persistent connection to every user, a high-volume pub/sub system might need to maintain connections to thousands of subscribing users simultaneously. Such a requirement may limit the system's ability to scale upward and may create other implementation challenges.

If a pub/sub system distributes multiple, heterogeneous, types (or "topics") of information, some of those topics may comprise larger messages or more frequent messages than do other topics. In some cases, one of those larger messages may be too large to transmit to a user by means of a single write command. This constraint may be a function of software, communications, or hardware limitations, such as a write buffer of an I/O interface that is too small to hold the entire message, or a port that has insufficient bandwidth to handle frequent I/O requests without queuing.

In such cases, a pub/sub system may respond to an inability to immediately transmit an entire message by notifying its operating software that it will require one or more additional buffers, I/O ports, sockets, or other communications resources, when they become available, in order to complete a transmission of an unsent message or of an unsent portion of a message. In some environments, this notifying may be referred to by those skilled in the art as an expression of "write interest" in a socket or other communications resource. Managing such a mechanism may be resource-intensive, and may further reduce a system's scalability by forcing the system to continually track the status of write-interest notifications and to determine which sockets or other resources associated with a write-interest notification are ready for writing.

One alternative to a pub/sub communications mechanism is a "polling" communications mechanism, such as a polling system based on the Internet's well-known HyperText Transport Protocol (HTTP). Polling systems distribute information by means of a "pull" mechanism, wherein data is transmitted to a user only at the user's request. In such a mechanism, a system might periodically "poll" each user, wherein a poll operation comprises sampling a status of an external user device by sending a signal through a communications medium to the user device, and then awaiting a response that indicates whether the user is available, has requested information, and is ready to receive the requested information. A polling system might periodically fulfill such information requests by transmitting requested information to each user determined to be in a state of readiness to receive data.

In some implementations (such as "busy waiting" polling), a system need not actually access a user device until a periodic polling operation indicates that the user's I/O device is ready to communicate. In some implementations, if a polling operation indicates that a user's I/O device is not ready, the system may be free to perform other tasks until the next scheduled polling operation is due.

Because each user in a polling system requires an active connection only long enough to perform a requested data transfer, a polling system need not maintain persistent connections. If, for example, the tennis-score system described above used a polling mechanism, that system would send a score to a user only in response to the user's request for the score. Unlike the pub/sub version, it would not need to maintain an ongoing connection with each user in order to be able to update every user whenever any subscribed topic (that is, each match's score) is updated.

A polling version of the tennis-score system may also use fewer resources because it can send an aggregated update of all score changes that have occurred since a prior transmission, rather than sending a distinct update to each user for every score change. Finally, a polling mechanism may make more efficient use of resources because it need communicate only with users that it confirms, by means of its polling, are ready to receive data, unlike a pub/sub system that must send updates to every user regardless of whether a user is interested in the most current update.

Polling, however, may not provide as timely or as finely tailored communications as might an equivalent pub/sub mechanism. Because polling updates are transmitted only periodically, a user may not receive a particular update as soon as it would if the update had been sent by means of a pub/sub push mechanism through a dedicated, persistent, communications line.

Other issues may occur if a duration of time between polling operations (a "polling interval") is short compared to an average time between data updates. If this occurs, a client might pull the same data multiple times, before the data has a chance to be updated, generating needless demand on a server resource or on a communications infrastructure. Selection of an optimal polling interval in a polling system may thus require a compromise between a need to provide users with updated information as quickly as possible and a requirement to reduce resource consumption.

In multi-topic systems, therefore, a pub/sub push mechanism may thus provide a better user experience, but a polling mechanism may consume fewer resources. An optimal split of resources between the two types of mechanisms may be a function of a continuously varying demand upon a system resource, where that demand may continuously vary as a function of fluctuations in user needs and as a further function of one or more characteristics that distinguish topics. Thus, as system loads and user demands change, embodiments of the present invention may need to repeatedly evaluate patterns of resource consumption in order to determine an optimal division of topics between the two classes of communications mechanisms, such as a class of pull mechanisms and a class of push mechanisms. Embodiments of the present invention perform this task by assigning each topic to one the two classes of mechanisms as a function of a characteristic of the topic, such as an average size of a message associated with the topic, or a frequency at which messages associated with the topic are generated.

In one example, a system that distributes information divided into five topics to 200 users may be made to run more efficiently by an embodiment of the present method that optimally assigns each of the five topics to either a pub/sub distribution mechanism or to a polling distribution mechanism. This optimally assigning may, for example, comprise assigning messages associated with a first subset of the five topics to the publish/subscribe distribution mechanism and assigning messages associated with the remaining topics to the polling distribution mechanism. Here, the embodiment would not attempt to balance the system by merely counting users and then dividing those users between the two communications-distribution methods. It would instead associate each message with a particular distribution mechanism as a function of which topic is associated with the message.

In examples described below, embodiments of the present invention may allocate resources between a set of one or more publish/subscribe push mechanisms and a set of one or more HTTP polling pull mechanisms. These illustrative embodiments should not be construed to limit embodiments of the invention to systems that employ only pub/sub and polling mechanisms; the method of the present invention described here may easily be adopted to other types of load-balancing tasks, such as allocating resources by topic between an asynchronous communications mechanism and a synchronous communications mechanism, or between communications across a hard-wired local-area network and communications across a cellular network. The basic analytical method and topic-oriented load-balancing methodology, as described in FIGS. 1-2, is not limited to any specific type of information-distribution mechanism, resource, communications platform, or computing platform.

Figure 2:
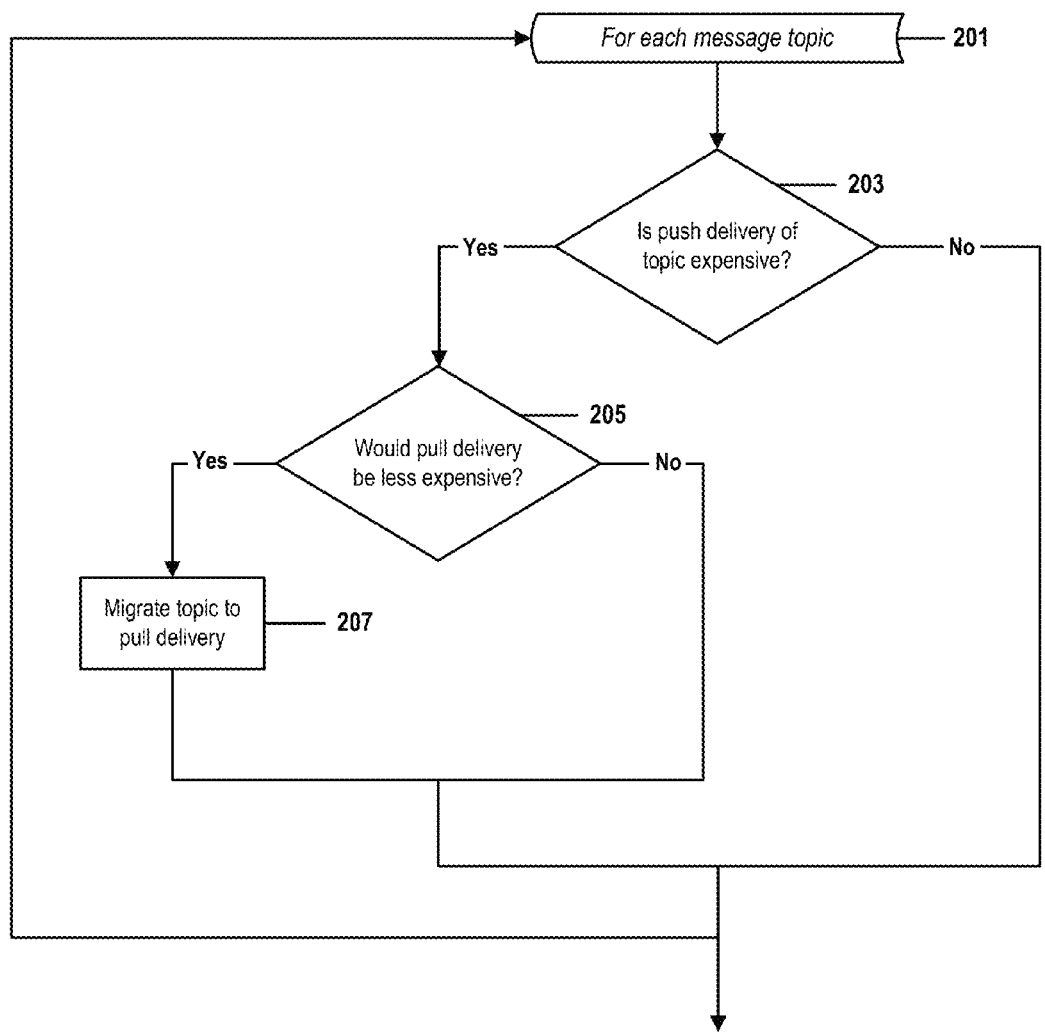
FIG. 2 is a flow chart that illustrates steps of a method for using analytics to optimize performance of a messaging system via topic migration to alternate delivery methods in accordance with embodiments of the present invention.

FIG. 1 shows a structure of a computer system and computer program code that may be used to implement a method for using analytics to optimize performance of a messaging system via topic migration to alternate delivery methods in accordance with embodiments of the present invention. FIG. 1 refers to objects 101-115.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for using analytics to optimize performance of a messaging system via topic migration to alternate delivery methods in accordance with embodiments of the present invention, and may implement other embodiments described in this specification, including the methods illustrated in FIGS. 1-2. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for using analytics to optimize performance of a messaging system via topic migration to alternate delivery methods.

Any of the components of the present invention could be created, integrated, hosted, maintained, deployed, managed, serviced, supported, etc. by a service provider who offers to facilitate a method for using analytics to optimize performance of a messaging system via topic migration to alternate delivery methods. Thus the present invention discloses a process for deploying or integrating computing infrastructure, comprising integrating computer-readable code into the computer system 101, wherein the code in combination with the computer system 101 is capable of performing a method for using analytics to optimize performance of a messaging system via topic migration to alternate delivery methods.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

FIG. 2 is a flow chart that illustrates steps of a method for using analytics to optimize performance of a messaging system via topic migration to alternate delivery methods in accordance with embodiments of the present invention. FIG. 2 comprises steps 201-207.

Step 201 takes place within a context of a messaging system in which a user may be connected by a push communications mechanism, a pull mechanism, or both. In the embodiment described below, the pull mechanism comprises an HTTP polling mechanism known to those skilled in the art of data communications and the push mechanism comprises a publish/subscribe mechanism known to those skilled in the art of data communications.

Here, the messaging system may, as described above, either push a message or other communication to a user through a persistent connection by means of the pub/sub mechanism or may transmit a message or other communication to a user at the request of the user by means of the polling mechanism. In the embodiments described herein, the messages or other communications may be categorized into topics, wherein each message or communication is associated with one topic.

In other embodiments, a message may be associated with multiple topics and a content of a message may be communicated to a user by a first mechanism when the message is identified, characterized by, or otherwise associated with a first topic, and may be communicated to the user by a second mechanism when the message is identified, characterized by, or otherwise associated with a second topic.

In other embodiments, the messaging system may support more than two communications-delivery mechanisms, more than one push-delivery mechanism, or more than one pull-delivery mechanism. In such embodiments, the present invention may comprise a method analogous to the method of FIG. 2, wherein the analogous method employs analogous information-gathering and decision-making steps in order to improve performance of the messaging system by migrating messages or communications associated with a topic to a different communications delivery system.

Step 201 begins an iterative process in which a processor of a computer system repeats steps 201-207 once for each message topic comprised by the messaging system.

In some embodiments, the iterative process of steps 201-207 may be repeated once for each topic that satisfies a condition or that is delivered by a particular message-delivery mechanism. In some embodiments, the iterative process of steps 201-207 may be repeated once for each topic that satisfies a first condition or that is delivered by a first message-delivery mechanism and may next be repeated once for each topic that satisfies a second condition or that is delivered by a second message-delivery mechanism.

For purposes of illustration, in the example described below, the iterative process of steps 201-207 is repeated once for each topic that is delivered by a publish/subscribe push message-delivery mechanism, as described above.

In this embodiment, messages associated with the first message topic are delivered by means of a publish/subscribe mechanism like the one described above, wherein each message is delivered to a subscriber-user through a persistent connection to that user, on a schedule determined by the publishing messaging system.

In step 203, the processor determines whether messages of a first message topic are being delivered efficiently by the messaging system. A topic that does not satisfy a condition of efficient delivery may be identified as an "expensive" topic.

This determining may be performed by any means known to those skilled in the art, based on criteria that may comprise, but are not limited to, design considerations, resource availability, performance-related factors, financial considerations, licensing fees, hardware or software constraints, other platform constraints, business goals, or other business-related factors.

In the embodiments described herein, the determining whether the first topic is expensive may comprise one or more of:
  determining that a number of write-interest calls exceeds a threshold value or satisfies an other condition, wherein the number of write-interest calls is a function of attempted deliveries of messages associated with the first topic;
  determining that an average message size exceeds a threshold value or satisfies an other condition, wherein the average message size identifies an average size of messages associated with the first topic;
  determining that a publishing rate exceeds a threshold value or satisfies an other condition, wherein the publishing rate identifies the rate at which messages associated with the first topic are published to subscribers; and
  examining metadata that identifies average message currency, timeliness, or relevance to determine how important it is for messages to be delivered quickly.

In some embodiments, the determining may be performed as a further function of resource consumption of the message-delivery mechanism. Such consumption may be an indication of how "busy" the mechanism, or its associated hardware or software components, are in response to demands made by delivery of messages associated with the first topic.

In such cases, the determining may consider parameters that comprise, but are not limited to, server CPU utilization, memory utilization, available disk capacity, numbers of concurrent user connections, numbers of active concurrent users, and network bandwidth utilization. Such parameters may be measured or logged using tools, technologies, and methods known to those skilled in the art.

In some embodiments, threshold values or other conditions by which the processor may determine that the first topic is expensive may be varied dynamically as a function how "busy" a component of the delivery mechanism is at the time of the determination. If, for example, a server is very busy, threshold values may be automatically lowered in order to migrate more topics to less-expensive delivery mechanisms.

At the conclusion of step 203, methods illustrated in FIG. 2 will have determined whether the first topic is an expensive topic when messages categorized by the first topic are delivered by means of the message-delivery mechanism currently associated with the first topic. If step 203 determines that the first topic is indeed expensive, then the method of FIG. 2 continues with step 205. If step 203 determines that the first topic is not currently an expensive topic, then the current iteration of the iterative process of steps 201-207 completes and, if a second topic is to be analyzed, a next iteration of the iterative process of steps 201-207 begins in order to analyze that second topic.

In step 205, the processor identifies whether the first topic, which has been determined to be an expensive topic in step 203, may be rendered less expensive by migrating the topic to a different message-delivery mechanism.

This identifying of step 205 may be performed by any means known to those skilled in the art. This identifying may be performed as a function of the determining of step 203, wherein a determination that the first topic is expensive is performed as a function of a particular threshold or other condition leads directly to a conclusion that a migration to a specific other message-delivery mechanism is likely or certain to make the topic less expensive.

If, for example, the processor in step 203 had determined that the first topic was expensive because a publishing rate associated with the first topic exceeded a threshold value, then the processor may deem that migrating the first topic to an HTTP polling delivery mechanism would most likely reduce the cost of delivering first topic messages because an HTTP polling mechanism could be tailored to reduce the rate at which messages of the first topic are delivered to users.

In other embodiments, many other types of analyses may be performed in order to identify whether migrating the first topic to a second, distinct message-delivery mechanism would make the first topic less expensive.

In the current example, the messaging system comprises only publish/subscribe push and HTTP polling pull delivery mechanisms, messages associated with the first topic are delivered exclusively by means of the push mechanism, and the first topic is deemed in step 203 to currently be expensive because the push message delivery of first-topic messages exceeds one or more threshold values that identify excessive resource consumption. In such an example, the processor in step 205 will determine whether migrating the first topic to the polling pull mechanism will make the first topic less expensive, where being less expensive is a function of lowering resource-consumption requirements or other requirements made necessary by the delivery of first-topic messages.

In some embodiments, the processor in step 205 may further determine that, although migrating the first topic to a different message-delivery mechanism may make the currently expensive first topic inexpensive or less expensive, such a migration may also directly or indirectly cause a second topic to become expensive or more expensive. In such embodiments, a more nuanced analysis may be performed in step 205 that considers an impact of migrating a first topic on the performance, efficiency, cost, or other characteristics of a second topic.

If the processor in step 205 determines that no other available delivery mechanism would make the first topic less expensive or otherwise satisfy criteria that make a migration desirable, then the current iteration of the iterative process of steps 201-207 completes and, if a second topic is to be analyzed, a next iteration of the iterative process of steps 201-207 begins in order to analyze that second topic.

If the processor in step 205 determines that no other available delivery mechanism would make the first topic less expensive or otherwise satisfy criteria that make a migration desirable, then a method of FIG. 2 may, in some embodiments, further analyze the first topic again in a future iteration of the iterative process of steps 201-207 in order to determine whether usage patterns, resource consumption, message characteristics, or other factors have changed such migrating the first topic to an other delivery mechanism would make the first topic less expensive.

If the processor in step 205 determines that migrating the first topic to a second delivery mechanism would make the first topic less expensive or otherwise satisfy criteria that make it desirable to migrate the first topic to the second delivery mechanism, then the method of FIG. 2 continues with step 207.

In step 207, the processor, having determined in step 203 that the first topic is expensive because delivering first-topic messages to users by means of a first delivery mechanism satisfies a certain condition, or because a characteristic of messages associated with the first topic, of a users that receive messages associated with the first topic, or of a usage pattern of users that receive messages associated with the first topic, and then having determined in step 205 that migrating the first topic to a second message-delivery mechanism would make the first topic less expensive or would otherwise satisfy criteria that make such a migration desirable, then migrates the first topic to the second message-delivery mechanism.

This migration may be performed by any means known to those skilled in the art of data communications, information technology, or other relevant arts. In our ongoing example, if the processor has in steps 203-205 determined that the first topic would be, or would likely be, made less expensive by migrating the first topic from a publish/subscribe delivery mechanism to an HTTP polling delivery mechanism, the processor (acting as a publish/subscribe server) might in step 207, using techniques, tools, and technologies known to those skilled in the art, notify subscriber/client users that future messages related to the first topic will be delivered by means of a polling mechanism.

Such a notification might, for example, comprise one or more notification messages sent through the publish/subscribe mechanism, wherein the one or more notification messages may be formatted in a distinctive way to help a subscriber recognize the notification messages as instructions for communicating by means of the second delivery mechanism.

In some embodiments, such instructions might identify a new messaging server's host name or Internet Protocol (IP) address, the new server's connection mechanism, the new server's TCP/IP port or socket identifier, an identification of a polling interval, a URL (universal resource locator) identifier that helps identify a source of future first-topic messages, or other information necessary for or related to migrating to the second message-delivery mechanism.

In this example, a client, upon receiving the one or more notification messages, would, using methods known to those skilled in the art, unsubscribe from the first topic, establish a connection to the new server, and begin polling for first-topic messages using the second message-delivery mechanism (here, the HTTP polling mechanism).

In embodiments described herein, such a migration might be invisible to the user. Furthermore, iterations of the method of FIG. 2 might repeatedly migrate a topic back and forth between two or more delivery mechanisms, based on repeated comparisons of relative expensiveness of the first topic made by iterations of the iterative process of steps 201-207 of FIG. 2, and such repeated migrations might further be invisible to the user. In such cases, the most prominent effect upon the user might be improved system performance or lower monetary or resource costs incurred by delivery of topics associated with the first topic.

If an embodiment of the present invention were to determine that the first topic should be migrated back to the publish/subscribe pull mechanism, a similar set of migration steps, again known to those skilled in the arts, would be implemented in order to transition each user's first-topic message delivery back to the publish/subscribe mechanism. Such a migration might, for example, comprise an asynchronously transmitted notification to each user, wherein that notification may comprise information such as a URL, connection method, and port identifier associated with the publish/subscribe mechanism.

In all embodiments of the present invention, messages are migrated to the second delivery mechanism as a function of the topic or topics with which they are associated. Messages are not migrated as a function of the identify of a message-delivery recipient. Therefore, if an embodiment identifies that messages associated with a particular topic are too large, are too frequent, are too small, or satisfy some other criteria or condition associated with resource consumption or other type of message-delivery cost, then all messages associated with that topic will be migrated to the second delivery mechanism.

Embodiments of the present invention do not migrate all messages received by a particular user as a function of a characteristic of the user, the user's usage patterns, or of resources owned by or otherwise associated with the user.

At the conclusion of step 207, the current iteration of the iterative process of steps 201-207 completes and, if a second topic is to be analyzed, a next iteration of the iterative process of steps 201-207 begins the analysis of that second topic.

In some embodiments, step 207 of the method of FIG. 2 may be performed multiple times in succession, but not until a set of iterations of the iteration process of steps 201-205 are first completed. At the completion of the set of iterations, these embodiments will have enumerated a set of topics that are to be migrated to a different delivery mechanism. Only then will procedures analogous to those of step 207 described above be performed, in order to migrate en masse all topics identified or flagged for migration in the previous performances of the procedure of step 205.

In such embodiments, more sophisticated determinations and decision may be made. It is possible, for example, for such an embodiment to review characteristics of and relationships among a subset of the topics identified or flagged for migration in order to optimize a system-wide migration plan. Such optimization might, for example, comprise eliminating or revising identifications that would migrate topics in opposite directions, thereby canceling the effect of each topic's migration. Such optimization might also perform functions like determining whether a group of migrations would have sufficient effect on system performance to preclude a necessity for further migrations, or would have aggregate effect that is greater or less than would be anticipated by only considering each migration in isolation.

What is claimed is:

1. A method for optimizing operation of a messaging system, the method comprising:
    wherein the messaging system is capable of using either of two delivery means to deliver each message of a plurality of messages to one or more users of a plurality of users,
    wherein each message of the plurality of messages is characterized by a topic of a plurality of topics,
    wherein each topic of the plurality of topics is initially associated with either one or the other of the two delivery means,
    wherein a first topic of the plurality of topics is associated with a first delivery means of the two delivery means,
    wherein the messaging system employs the first delivery means to deliver all messages characterized by the first topic, and
    wherein a first message of the plurality of messages is characterized by the first topic,
    a processor of a computer system determining that delivering the first message by the first delivery means triggers a warning condition,
        wherein the warning condition comprises a total number of write-interest calls to a particular socket of the messaging system exceeding a first threshold value,
            wherein the write-interest calls are associated with the first topic, and
            wherein the total number of write-interest calls are received by the messaging system within a set duration of time;
    the processor disassociating the first topic from the first delivery means;
    the processor reassociating the first topic with a second delivery means of the two delivery means that is distinct from the first delivery means; and
    the processor instructing the messaging system to begin delivering all messages associated with the first topic by the second delivery means.

2. The method of claim 1, further comprising:
    the processor disassociating and reassociating only if the processor determines that delivering the first message by the second delivery means would not cause a characteristic of the first topic to trigger a warning condition.

3. The method of claim 1, wherein the two delivery means consist of a push delivery means and a pull delivery means.

4. The method of claim 3, wherein the pull delivery mechanism is selected from a group consisting of: HTTP polling, long polling, and busy-wait polling.

5. The method of claim 3, wherein the push delivery means is a publish/subscribe communications architecture.

6. The method of claim 3,
    wherein the first delivery means is a publish/subscribe communications architecture,
    wherein the delivering the first message by means of the first delivery means comprises communicating the first message to a first subset of users of the plurality of users,
    wherein the first subset of users comprises all users of the plurality of users that are subscribed to the first topic, and
    wherein the first delivery means comprises sending information to a recipient user of the first subset of users through a persistent connection between the messaging system and the recipient user.

7. The method of claim 6, wherein the disassociating and reassociating comprises the processor automatically notifying the recipient user that the persistent connection between the messaging system and the recipient user will be closed and that the messaging system will begin delivering messages characterized by the first topic by the pull delivery means.

8. The method of claim 1, further comprising providing at least one support service for at least one of creating, integrating, hosting, maintaining, and deploying computer-readable program code in the computer system, wherein the computer-readable program code in combination with the computer system is configured to implement the determining, the disassociating, the reassociating, and the configuring.

9. A computer program product, comprising a computer-readable hardware storage device having a computer-readable program code stored therein, said program code configured to be executed by a processor of a computer system to implement a method for optimizing operation of a messaging system,
    wherein the messaging system is capable of using either of two delivery means to deliver each message of a plurality of messages to one or more users of a plurality of users,
    wherein each message of the plurality of messages is characterized by a topic of a plurality of topics,
    wherein each topic of the plurality of topics is initially associated with either one or the other of the two delivery means,
    wherein a first topic of the plurality of topics is associated with a first delivery means of the two delivery means,
    wherein the messaging system employs the first delivery means to deliver all messages characterized by the first topic, and
    wherein a first message of the plurality of messages is characterized by the first topic,
    the method comprising:
    a processor of a computer system determining that delivering the first message by the first delivery means triggers a warning condition,
        wherein the warning condition comprises a total number of write-interest calls to a particular socket of the messaging system exceeding a first threshold value,
            wherein the write-interest calls are associated with the first topic, and
            wherein the total number of write-interest calls are received by the messaging system within a set duration of time;
    the processor disassociating the first topic from the first delivery means;
    the processor reassociating the first topic with a second delivery means of the two delivery means that is distinct from the first delivery means; and
    the processor instructing the messaging system to begin delivering all messages associated with the first topic by the second delivery means.

10. The computer program product of claim 9, further comprising:

the processor disassociating and reassociating only if the processor determines that delivering the first message by the second delivery means would not cause a characteristic of the first topic to trigger a warning condition.

11. The computer program product of claim 9, wherein the two delivery means consist of a push delivery means and a pull delivery means.

12. The computer program product of claim 11, wherein the pull delivery mechanism is selected from a group consisting of: HTTP polling, long polling, and busy-wait polling.

13. The computer program product of claim 11, wherein the push delivery means is a publish/subscribe communications architecture.

14. The computer program product of claim 11,
wherein the first delivery means is a publish/subscribe communications architecture,
wherein the delivering the first message by means of the first delivery means comprises communicating the first message to a first subset of users of the plurality of users,
wherein the first subset of users comprises all users of the plurality of users that are subscribed to the first topic, and
wherein the first delivery means comprises sending information to a recipient user of the first subset of users through a persistent connection between the messaging system and the recipient user.

15. The computer program product of claim 14, wherein the disassociating and reassociating comprises the processor automatically notifying the recipient user that the persistent connection between the messaging system and the recipient user will be closed and that the messaging system will begin delivering messages characterized by the first topic by the pull delivery means.

16. A computer system comprising a processor, a memory coupled to said processor, and a computer-readable hardware storage device coupled to said processor, said storage device containing program code configured to be run by said processor via the memory to implement a method for optimizing operation of a messaging system,
wherein the messaging system is capable of using either of two delivery means to deliver each message of a plurality of messages to one or more users of a plurality of users,
wherein each message of the plurality of messages is characterized by a topic of a plurality of topics,
wherein each topic of the plurality of topics is initially associated with either one or the other of the two delivery means,
wherein a first topic of the plurality of topics is associated with a first delivery means of the two delivery means,
wherein the messaging system employs the first delivery means to deliver all messages characterized by the first topic, and
wherein a first message of the plurality of messages is characterized by the first topic,
the method comprising:
a processor of a computer system determining that delivering the first message by the first delivery means triggers a warning condition,
wherein the warning condition comprises a total number of write-interest calls to a particular socket of the messaging system exceeding a first threshold value,
wherein the write-interest calls are associated with the first topic, and
wherein the total number of write-interest calls are received by the messaging system within a set duration of time;
the processor disassociating the first topic from the first delivery means;
the processor reassociating the first topic with a second delivery means of the two delivery means that is distinct from the first delivery means; and
the processor instructing the messaging system to begin delivering all messages associated with the first topic by the second delivery means.

17. The computer system of claim 16, wherein the two delivery means consist of a polling mechanism and a publish/subscribe communications architecture.

* * * * *